(12) United States Patent
Vaughn et al.

(10) Patent No.: US 11,902,038 B2
(45) Date of Patent: Feb. 13, 2024

(54) SECURING DATA PRESENTED DURING VIDEOCONFERENCING

(71) Applicant: Kyndryl, Inc., New York, NY (US)

(72) Inventors: Garfield W. Vaughn, South Windsor, CT (US); Martin G. Keen, Cary, NC (US); Gandhi Sivakumar, Bentleigh (AU); Abhishek Jain, Baraut (IN)

(73) Assignee: KYNDRYL, INC., New York, NY (US)

( * ) Notice: Subject to any disclaimer, the term of this patent is extended or adjusted under 35 U.S.C. 154(b) by 46 days.

(21) Appl. No.: 17/865,993

(22) Filed: Jul. 15, 2022

(65) Prior Publication Data
US 2024/0022446 A1 Jan. 18, 2024

(51) Int. Cl.
| | |
|---|---|
| *H04N 7/15* | (2006.01) |
| *H04L 12/18* | (2006.01) |
| *G08B 21/22* | (2006.01) |
| *G08B 5/22* | (2006.01) |

(52) U.S. Cl.
CPC .......... *H04L 12/1822* (2013.01); *G08B 5/222* (2013.01); *G08B 21/22* (2013.01); *H04N 7/15* (2013.01)

(58) Field of Classification Search
CPC ........... H04L 12/18; G08B 5/22; G08B 21/22; H04N 7/15
USPC ........................................... 348/14.01–14.16
See application file for complete search history.

(56) References Cited

U.S. PATENT DOCUMENTS

| | | | |
|---|---|---|---|
| 8,842,161 B2 | 9/2014 | Feng et al. | |
| 2016/0036875 A1* | 2/2016 | High | H04L 67/60 |
| | | | 709/204 |
| 2019/0147175 A1* | 5/2019 | Varerkar | G06V 10/764 |
| | | | 726/26 |
| 2021/0073421 A1 | 3/2021 | Anderson et al. | |
| 2021/0157933 A1* | 5/2021 | Turano | G06F 21/604 |
| 2021/0385412 A1 | 12/2021 | Matula et al. | |
| 2021/0390215 A1 | 12/2021 | Sangle-Ferriere | |
| 2023/0208663 A1* | 6/2023 | Jovanovic | H04N 7/147 |
| | | | 709/204 |

FOREIGN PATENT DOCUMENTS

WO 2008063700 5/2008

OTHER PUBLICATIONS

Mell et al., "The NIST Definition of Cloud Computing", NIST, Special Publication 800-145, Sep. 2011, 7 pages.

(Continued)

*Primary Examiner* — Melur Ramakrishnaiah
(74) *Attorney, Agent, or Firm* — Erik Swanson; Andrew M. Calderon; Calderon Safran & Cole, P.C

(57) ABSTRACT

A method includes: determining, by a videoconference server, a level of tolerated risk for a videoconference between a presenter and an attendee; obtaining, by the videoconference server, sensor data from at least one sensor at a location where a user device of the attendee displays the videoconference; generating, by the videoconference server, a current risk score based on the sensor data; determining, by the videoconference server, the current risk score exceeds the level of tolerated risk; and presenting, by the videoconference server and in response to the determining the current risk score exceeds the level of tolerated risk, an alert to the presenter of the videoconference.

20 Claims, 7 Drawing Sheets

(56) References Cited

OTHER PUBLICATIONS

Anonymous, "Method and Apparatus for Environment-Aware Information Redaction", IP.com, IPCOM000262398D, May 27, 2020, 5 pages.

Groeningen T. et al., "An Ultrasonic Sensor for Human Presence Detection to Assist Rescue Work in Large Buildings", ISPRS Annals of the Photogrammetry, Remote Sensing and Spatial Information Sciences, vol. IV-4/W7, Sep. 2018, 1 page.

* cited by examiner

SECURING DATA PRESENTED DURING VIDEOCONFERENCING

BACKGROUND

Aspects of the present invention relate generally to videoconferencing and, more particularly, to securing data presented during videoconferencing.

One type of electronic meeting is videoconferencing, which is the holding of a conference among people at remote locations by way of transmitted audio and video signals. Videoconferencing typically involves each user being connected to a videoconferencing server via their computing device. Video of the videoconference is displayed by each user's computing device, e.g., in an interface of the videoconference program. Audio of the videoconference is output by speakers included in or connected to each user's computing device. In some instances, a user computing device may include a camera for capturing video of the user and a microphone for capturing audio of the user, which is combined into the stream of the videoconference that is seen and heard by other users.

A common feature of videoconferencing is to share one's screen with other members of the videoconference. Using this feature, a user may show a document displayed in a window on their computing device to other users in the videoconference. The screenshare appears in the other users' videoconference interface.

SUMMARY

In a first aspect of the invention, there is a computer-implemented method including: determining, by a videoconference server, a level of tolerated risk for a videoconference between a presenter and an attendee; obtaining, by the videoconference server, sensor data from at least one sensor at a location where a user device of the attendee displays the videoconference; generating, by the videoconference server, a current risk score based on the sensor data; determining, by the videoconference server, the current risk score exceeds the level of tolerated risk; and presenting, by the videoconference server and in response to the determining the current risk score exceeds the level of tolerated risk, an alert to the presenter of the videoconference.

In another aspect of the invention, there is a computer program product including one or more computer readable storage media having program instructions collectively stored on the one or more computer readable storage media. The program instructions are executable to cause a videoconference server to: determine a level of tolerated risk for a videoconference between a presenter and an attendee; obtain sensor data from at least one sensor at a location where a user device of the attendee displays the videoconference; generate a current risk score based on the sensor data, wherein the current risk score is a probability that another person is in the location where the user device of the attendee displays the videoconference; determine the current risk score exceeds the level of tolerated risk; and in response to the determining the current risk score exceeds the level of tolerated risk, present an alert to the presenter of the videoconference.

In another aspect of the invention, there is system including a processor, a computer readable memory, one or more computer readable storage media, and program instructions collectively stored on the one or more computer readable storage media. The program instructions are executable to: determine a level of tolerated risk for a videoconference between a presenter and an attendee; obtain sensor data from at least one sensor at a location where a user device of the attendee displays the videoconference; generate a current risk score based on the sensor data, wherein the current risk score is a probability that another person is in the location where the user device of the attendee displays the videoconference; determine the current risk score exceeds the level of tolerated risk; and in response to the determining the current risk score exceeds the level of tolerated risk concurrently with confidential data being displayed in the videoconference, present an alert to the presenter of the videoconference

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
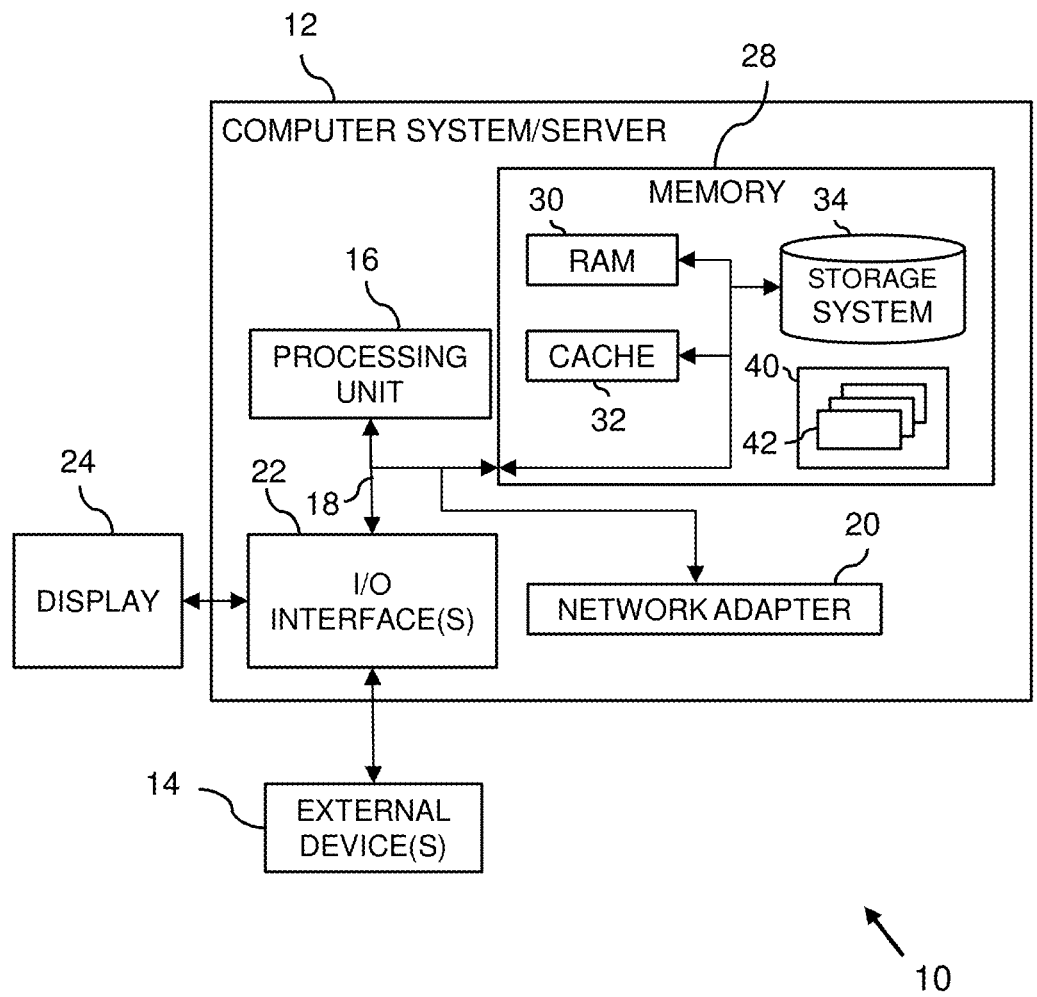
FIG. 1 depicts a cloud computing node according to an embodiment of the present invention.

Aspects of the present invention relate generally to videoconferencing and, more particularly, to securing data presented during videoconferencing. Implementations of the invention leverage sensor data and artificial intelligence (AI) to detect when confidential data presented during a videoconference is susceptible to being viewed by an unauthorized person. In response to this detecting, embodiments cause the videoconference system to output an alert to one or both of the videoconference presenter and the videoconference attendee. In this manner, implementations of the invention are usable to provide security measures for confidential data that is displayed during a videoconference.

Organizations constantly struggle to secure their critical data within their own premises, as well as outside their premises, for multiple security compliance reasons. A data security breach could happen either because of human error or with malicious intent.

An organization's endpoint devices such as laptops, mobile tablets, smartphones, and handheld gadgets are the new way of working due to ease of mobility and accessibility; however, managing the security of these devices is difficult. Users often utilize these devices to access the organization's data by connecting to unsecured networks such as public networks and private networks that are outside the control of the organization. This behavior increases the likelihood of a data breach because of the unsecure network connections.

To reduce the likelihood of a data breach, organizations sometimes provide their users with secure data communication through a virtual private network (VPN) using a firewall with which data is encrypted when at rest and in motion. There are also solutions available that provide secure cloud or on-premises storage of backups of data saved on endpoint devices. Using these solutions, a user that loses their endpoint device can have their data restored from the backup.

Another security level for endpoint devices is achieved using security monitoring and analysis, which captures data on the overall state of a system, including endpoint devices and connectivity traffic. This data is analyzed to detect possible security violations or potential system threats based on anomalous behavior.

Multi-factor authentication is yet another way of securing data access on endpoint devices. But it is still critical to ensure that endpoints devices are secured from possible data breach, tampering, and manipulation, which could result in financial loss to an organization.

Videoconferencing is near-ubiquitous and has become a normal way to communicate in both personal and professional settings. In the professional setting, videoconferencing is a normal way to communicate with co-workers and other collaborators. In some situations, confidential data is shared during the videoconference. For example, a user may screenshare a document during the videoconference, and the document being shared may include confidential data that is intended to be seen only by the attendees of the videoconference. However, there are situations when a person that is not an attendee of the videoconference can visually see the display of the videoconference as it is displayed by the device of an attendee. For example, a videoconference attendee may be seated and participating in a videoconference using their laptop, and a non-attendee may walk near where the attendee is seated and be able to see the display of the laptop. In this situation, the non-attendee is able to see the visual content of the videoconference, which might include confidential data that the non-attendee is not authorized to see. This is a form of data breach that is present is current videoconferencing systems.

Implementations of the invention address these problems by providing enhancements to videoconferencing systems that detect when an unauthorized person is capable of seeing confidential data presented during a videoconference and, in response to the detecting, cause the videoconference system to output an alert to one or both of the videoconference presenter and the videoconference attendee. In embodiments, the system detects and connects with Internet of Things (IoT) sensors or security devices at the attendee's location and utilizes the output of these sensors or security devices to predict when another person is in a position to see the attendee's computer display that is displaying content of the videoconference. In embodiments, the system includes an artificial intelligence component, such as one or more machine learning models, that receive the sensor data as input and that output a scored probability that another user can see the videoconference on the attendee's device. In this manner, implementations of the invention address the above-described problem of data breach during videoconferencing by collecting specialized sensor data, using the sensor data with artificial intelligence to predict a scored probability of a data breach, and generating an alert when the scored probability exceeds a threshold.

As will be understood from the description herein, implementations of the invention may include a computer implemented method comprising: identifying, by a computer, a Level of Tolerated Risk (LTR) associated with presentation content; determining, by the computer, using an AI model, that a present level of risk associated with a presentation environment exceeds the LTR; and initiating, by the computer, a Cautionary Action (CA) in response to the determining. The LTR may be based on the attributes of the presentation material (e.g., extracted from content metadata or provided by a content provider). The AI model may be trained to recognize conditions relevant to the presentation environment (e.g., as indicated by IoT sensors associated with the presentation environment). The AI model may consider presentation environment conditions indicated by recognized facial expressions of a relevant presenter. The CA may provide a warning to a presenter regarding the presence in the presentation environment of at least one of an unwanted audience member, an unwanted recording device, and unwanted presentation recording software. The CA may provide a visual indication to the presenter (e.g., a color-coded screen overlay, etc.). The computer may be in communication with the IoT sensors located proximate to the presentation environment.

As described herein, a videoconference presenter may present confidential data to the videoconference attendees, and this data may be at risk of a breach due to other persons being able to see the attendees' display of the videoconference. Implementations of the invention improve a presenter's experience in the video conference by providing security measures to help reduce the likelihood of such a breach. Implementations may be used in addition to existing multi-factor authentication mechanisms by which an attendee confirms their identify before joining the videoconference.

Embodiments provide a mechanism that will detect if a third-party person is in the attendee's endpoint device field of view. Implementations may use one or more different types of sensors to detect a third-party person within the vicinity of the attendee's endpoint device.

Implementations can be used to enhance videoconference software to detect existing IoT sensors or security devices in the vicinity of an attendee's endpoint device. Examples of such sensors include but are not limited to cameras, ultrasonic sensors, infrared sensors, light detection and ranging (LIDAR) sensors, Li-Fi sensors, microphones, and carbon content detection sensors. In embodiments, when an attendee endpoint device is first connecting to a videoconference, a system causes the attendee endpoint device to discover and connect to such sensors that are within a same room as the attendee endpoint device. In embodiments, the system leverages the output of the connected sensors to detect when another person enters the room with the attendee during the videoconference, and to generate an alert to the attendee and/or the videoconference presenter based on the detecting the other person has entered the room.

Implementations may be used to enhance videoconferencing systems by configuring the systems to learn and recognize user expressions that are associated with another person entering a room with an attendee of the videoconference. This may be performed using an AI component such as a machine learning model that is trained to recognize user expressions that are associated with another person entering a room. In this manner, the system may use the machine learning model in real time during a videoconference to detect when a person has entered a room with an attendee of the videoconference. In one example, the user expressions comprise facial expressions and the AI component comprises a convolutional neural network (CNN) trained for facial expression recognition.

Implementations may be used to prevent a third-party person from obtaining an image of the attendee's endpoint device while the endpoint device is displaying confidential data during the videoconference. In embodiments, this is achieved using infrared blocking techniques.

In embodiments, the system determines a subset of IoT sensors to use for detecting the presence of an unauthorized person in the room with the videoconference attendee. In these embodiments, the system may enable communication with the determined subset of IoT sensors and disable communication with other ones of the IoT sensors that are not included in the subset.

In implementations, the system generates an alert to the videoconference presenter when a determined risk score exceeds a predefined threshold. The alert can be in the form of a hint that is presented to the videoconference presenter in their interface of the videoconference. In response to receiving the hint, the videoconference presenter may take action to stop displaying the confidential material in the videoconference. In one example, the videoconference presenter may stop a screen share of a confidential document. In another example, the videoconference presenter may disconnect the attendee from the videoconference. In one exemplary implementation, the hint comprises one of plural different visualizations that signify different levels of concern, such as a green icon signifying a low level of concern of a data breach, a yellow icon signifying a medium level of concern, and a red icon signifying a high level of concern.

Implementations as described herein enable a videoconferencing system to identify a confidentiality level requirement for a videoconference as set by the presenter. The confidentiality level requirement may be one of high, medium, and low, for example. The confidentiality level requirement may be identified using machine learning techniques that determine the confidentiality from the content of the videoconference before presentation in the videoconference. The confidentiality level requirement may be identified using a tagging method in which a frame in the video or slide in the presentation is tagged as confidential.

Implementations as described herein enable a videoconferencing system to provide a presenter with a view through which the presenter can set required preferences before starting or setting up the videoconference. In this way, the videoconference attendees are made aware of and understand prerequisites for attending the videoconference. The prerequisites may include for example: each attendee should be alone in the field of view of their camera while confidential data is displayed; attendees should not screenshot an interface of the videoconference on the attendee's endpoint device; and attendees should not save content of the videoconference on the attendee's endpoint device using background recording software.

Implementations as described herein enable a videoconferencing system to detect and connect to existing IoT sensors in an attendee's location (e.g., room) using application programming interfaces (APIs) of the IoT sensors. In embodiments, the system creates categories of sensors based on the output data streams the sensors provide. In embodiments, the system processes data steams coming from the IoT sensors, such as a motion detector in the room, a sound detector trained for human identification, ultrasonic sensors, carbon content-based detectors, and Li-Fi based detectors that can identify human presence in the same room as the attendee endpoint device.

Implementations as described herein enhance a videoconferencing system by helping an attendee's endpoint device connect with IoT sensors automatically when the videoconference begins. In embodiments, the endpoint device is configured to identify to the videoconferencing system whether the endpoint device has ultrasonic and/or infrared sensors installed in the endpoint device itself, and to enable the videoconferencing system to use these sensors during the videoconference. In embodiments, the endpoint device is configured to identify to the videoconferencing system whether the endpoint device has some form of background recording and/or screenshot capability installed, and to enable the videoconferencing system to disable these functions on the endpoint device during the videoconference. In this manner, implementations as described herein enable a videoconferencing system to collaborate with existing hardware sensors and software capability on the attendee's endpoint device, and to collect information from these sensors and software for the purpose of maintaining the confidentiality of data presented in the videoconference.

Implementations as described herein enable a videoconferencing system to check whether the attendee's endpoint device has permission to access the IoT sensors in the room, to enable or disable the connection to certain ones of the IoT sensors during the videoconference, and to collect data from the IoT sensors for analysis. In embodiments, the system uses a machine learning model to learn facial expressions of the attendee that indicate another person is on the room. In this manner, the system may use the trained machine learning model in real time, with the attendee's facial expressions during the videoconference, to predict whether another person is in the room with the attendee.

Implementations as described herein enable a videoconferencing system to detect which IoT sensor data is relevant for identifying anomalies based on the defined confidentiality of the videoconference and analysis of the IoT sensor data. In embodiments and based on this relevancy determination, the system may selectively enable or disable an IoT sensor data stream during the videoconference.

Implementations as described herein enable a videoconferencing system to provide a hint to the videoconference presenter when an anomaly is detected during the videoconference. In response, the videoconference presenter can communicate with the attendee to indicate that the attendee's endpoint device does not meet the confidentiality criteria for attending the videoconference.

Implementations as described herein enable a videoconferencing system to capture environment anomalies and change a color of a visual indicator displayed in the videoconference based on a level of security. In this manner, by using a visual indicator, the presenter may be notified of the anomaly even if their audio is on mute.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
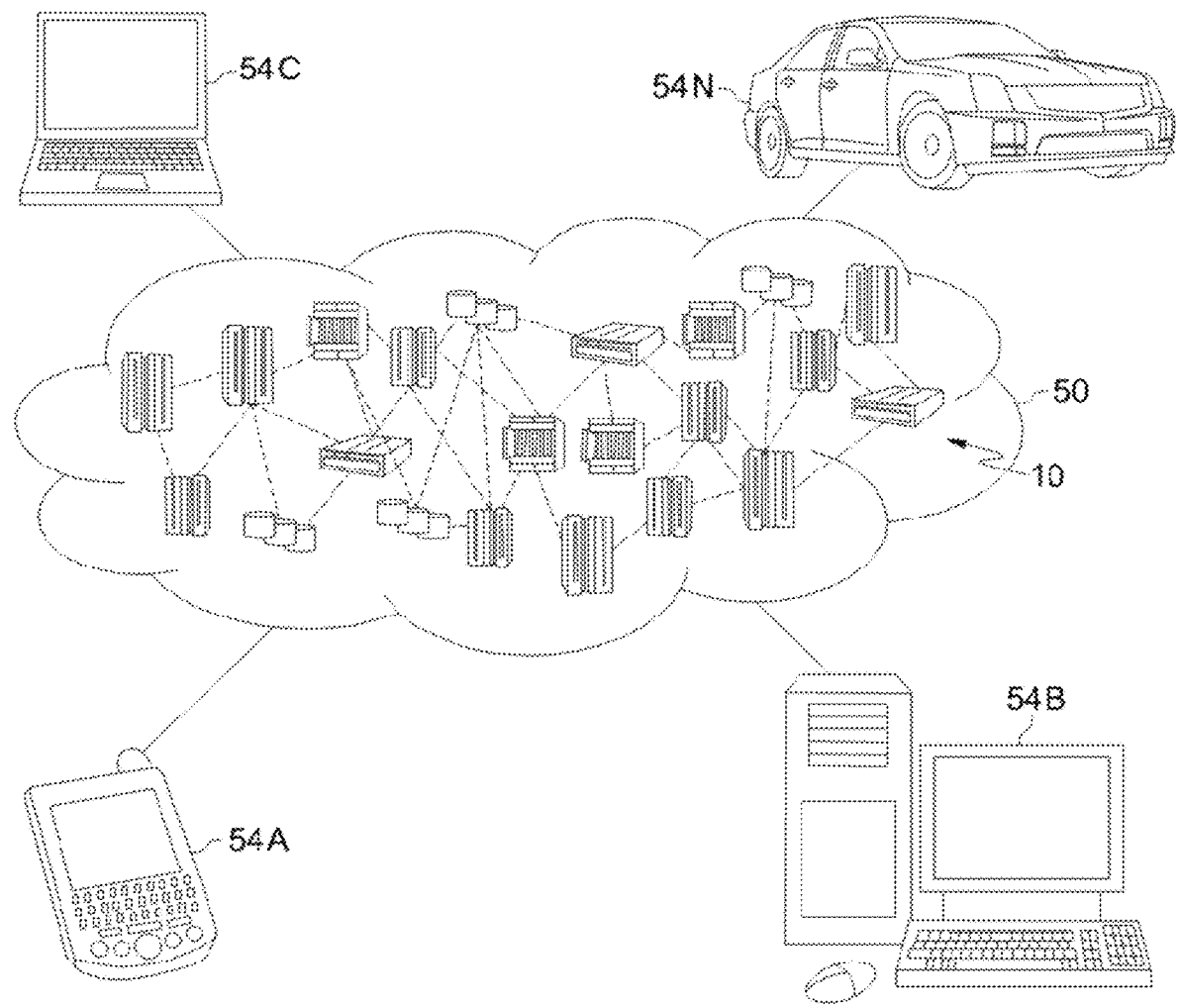
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
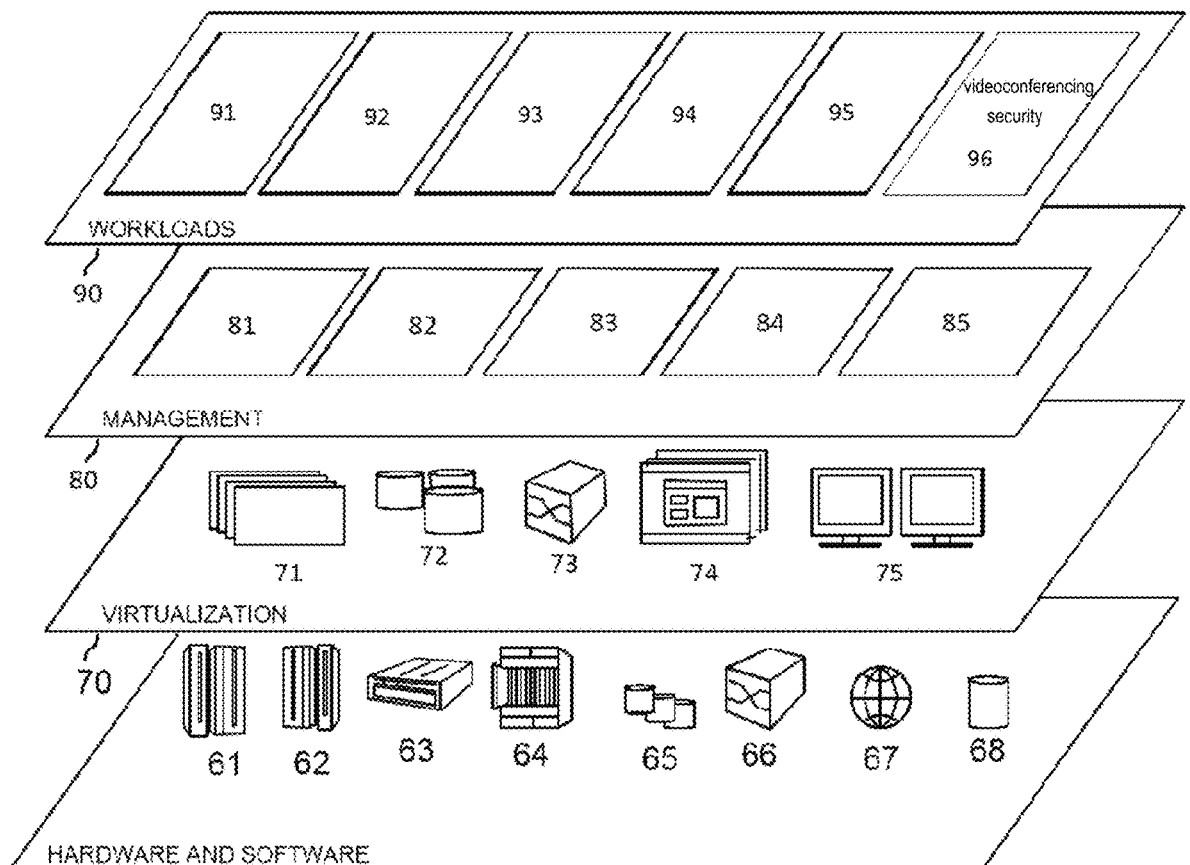
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and videoconferencing security 96.

Implementations of the invention may include a computer system/server 12 of FIG. 1 in which one or more of the program modules 42 are configured to perform (or cause the computer system/server 12 to perform) one of more functions of the videoconferencing security 96 of FIG. 3. For example, the one or more of the program modules 42 may be configured to: determine a level of tolerated risk for a videoconference between a presenter and an attendee; obtain sensor data from at least one sensor at a location where a user device of the attendee displays the videoconference; generate a current risk score based on the sensor data, wherein the current risk score is a probability that another person is in the location where the user device of the attendee displays the videoconference; determine the current risk score exceeds the level of tolerated risk; and in response to the determining the current risk score exceeds the level of tolerated risk, present an alert to the presenter of the videoconference.

Figure 4:
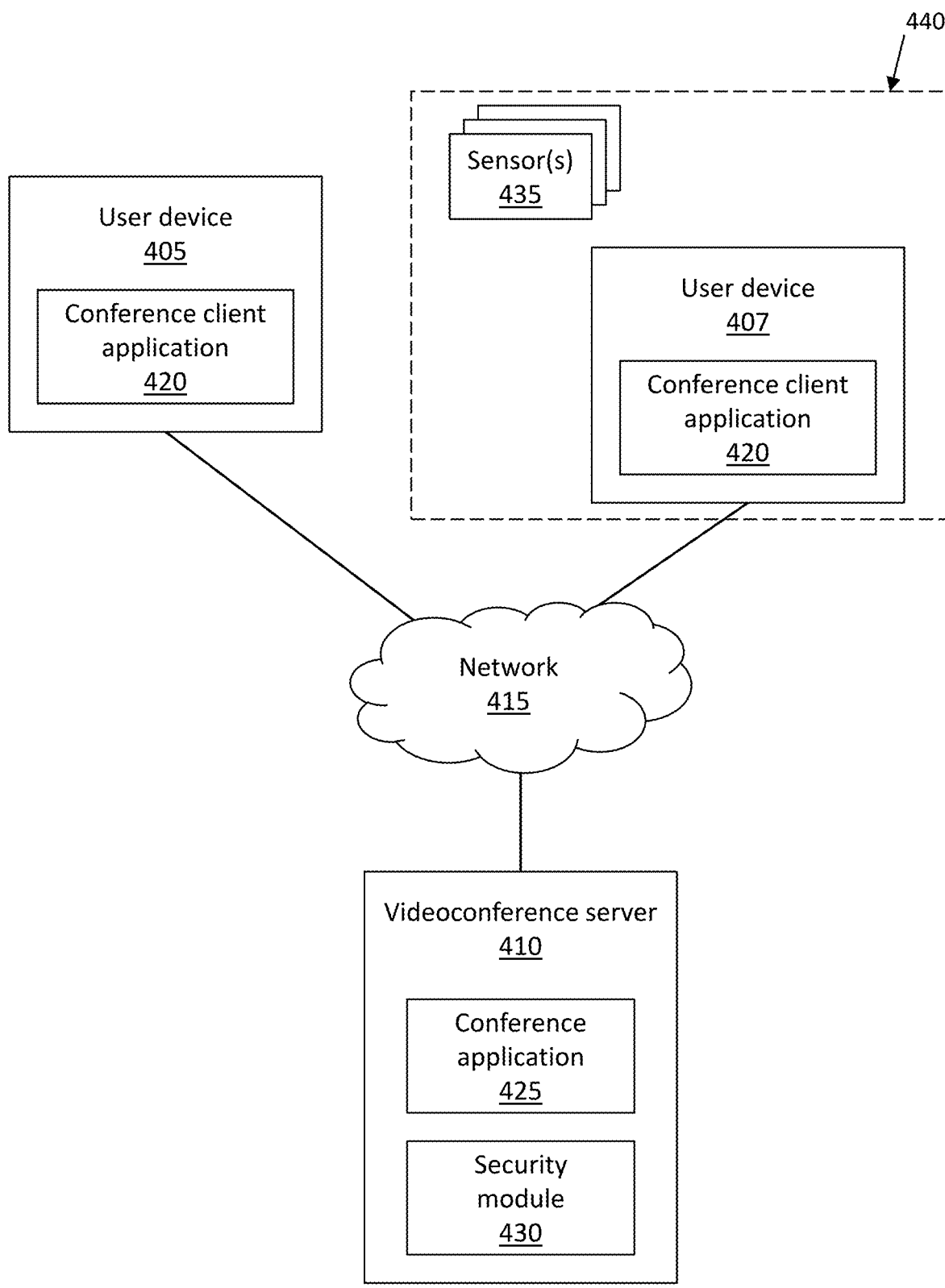
FIG. 4 shows a block diagram of an exemplary environment in accordance with aspects of the invention.

FIG. 4 shows a block diagram of an exemplary environment in accordance with aspects of the invention. In embodiments, the environment includes plural user devices 405, 407 and a videoconference server 410 connected to a network 415. The network 415 comprises one or more communication networks such as one or more of a LAN, WAN, and the Internet. Each of the user devices 405, 407 (also called an endpoint device) comprises a computing device such as a smartphone, tablet computer, laptop computer, desktop computer, etc., and may comprise one or more elements of the computer system 12 of FIG. 1. In embodiments, each of the user devices 405, 407 comprises a conference client application 420, which may comprise a software application such as a program/utility 40 of FIG. 1.

In embodiments, the videoconference server 410 comprises one or more computing servers each comprising one or more elements of computer system 12 of FIG. 1. In other embodiments, the videoconference server 410 comprises one or more virtual machines or one or more containers running on one or more computing servers. In a cloud embodiment, the network 415 comprises the cloud computing environment 50 of FIG. 2, the videoconference server 410 comprises one or more nodes 10, and the user devices 405, 407 each comprise one of computing devices 54A-N.

In embodiments, the videoconference server 410 comprises a conference application 425 which may comprise a software application such as a program/utility 40 of FIG. 1. In embodiments, the videoconference server 410 comprises a security module 430, which may comprise one or more program modules such as program modules 42 described with respect to FIG. 1. In one example, the security module 430 comprises a plug-in, add-on, or extension of the conference application 425. The videoconference server 410 may include additional or fewer programs and modules than those shown in FIG. 4. In embodiments, separate programs or modules may be integrated into a single program or module. Additionally, or alternatively, a single program or module may be implemented as multiple programs or modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the conference application 425 comprises a videoconferencing application that communicates with respective instances of the conference client application 420 on the user devices 405, 407 to provide videoconferencing services and functionality to the users of the user devices 405, 407. For example, the conference application 425 may receive audio and video signals from each of the user devices 405, 407 and generate a conference audio/video stream for output at each of the user devices 405, 407 so that the users of the user devices 405, 407 can participate in real-time videoconferencing. In embodiments, the conference application 425 is configured to permit a user of one of the user devices (e.g., 405) to share their screen with users of the other user devices (e.g., 407) during the real-time videoconferencing. For example, a first user may opt to share their screen showing a word-processing document, and the other users in the videoconference can see the screenshared portion of the word-processing document in a user interface of the conference client application 420 on their respective devices.

In embodiments, the conference application 425 is configured to permit a user of one of the user devices (e.g., 405) to be a presenter of the videoconference and another one of the user devices (e.g., 407) to be an attendee of the videoconference. For simplicity, only two user devices 405, 407 are shown in FIG. 4; however, there may be any number of user devices connected to the network 415 and associated with a videoconference in which one user is the presenter and all the other users are attendees. In embodiments, the conference application 425 and conference client application 420 are configured so that the presenter has access to certain videoconference controls that the attendee does not, as is common in the art. For example, the system may permit the presenter to provide input to perform actions such as allow attendees to join the videoconference (e.g., from a waiting room), disconnect attendees from the videoconference, turn off attendee audio feeds in the videoconference, turn off attendee video feeds in the videoconference, etc.

With continued reference to FIG. 4, in embodiments there is at least one sensor 435 at a location 440 associated with the user device 407 (e.g., the attendee user device in this example). The location 440 comprises a real-world, physical location such as a room or cubicle, for example. In embodiments, the sensor 435 comprises one or more sensors that collect data that can be used to detect when another person is in the location 440 with the attendee. For example, and without limitation, the sensor 435 may comprise one or more of: one or more video cameras, one or more ultrasonic sensors, one or more infrared sensors, one or more light detection and ranging (LIDAR) sensors, one or more Li-Fi sensors, one or more microphones, and one or more carbon content detection sensors. In one example, the sensors 435 comprise IoT sensors that are communicatively connected to the network 415 and that publish information to the network 415 for purposes that are unrelated to videoconferencing. In this example, the security module 430 leverages data generated by the IoT sensors for the auxiliary purpose of providing enhanced security to a videoconference hosted by the videoconference server 410. In another example, one or more of the sensors 435 may not be connected to the network 415 and may instead be accessed by the user device 407 communicating with the sensor. In this example, the user device 407 obtains data from the sensor and communicates the data to the videoconference server 410 via the network 415.

According to aspects of the invention, the security module 430 is configured to receive data from the sensors 435, detect when a person other than the attendee is in the location 440 based on the data from the sensors 435, and generate an alert to one or both the user devices 405, 407 based on the detecting the other person in the location 440.

In embodiments, the security module 430 is configured to determine when confidential data is displayed in the videoconference, and to generate the alert only when confidential data is being displayed and a person other than the attendee is in the location 440. In one example, the security module 430 determines when confidential data is being displayed in the videoconference based on user input (e.g., from the presenter using device 405). In another example, the security module 430 automatically determines when confidential data is being displayed in the videoconference by using an artificial intelligence component, such as natural language processing, object recognition in images, etc.

Figure 5:
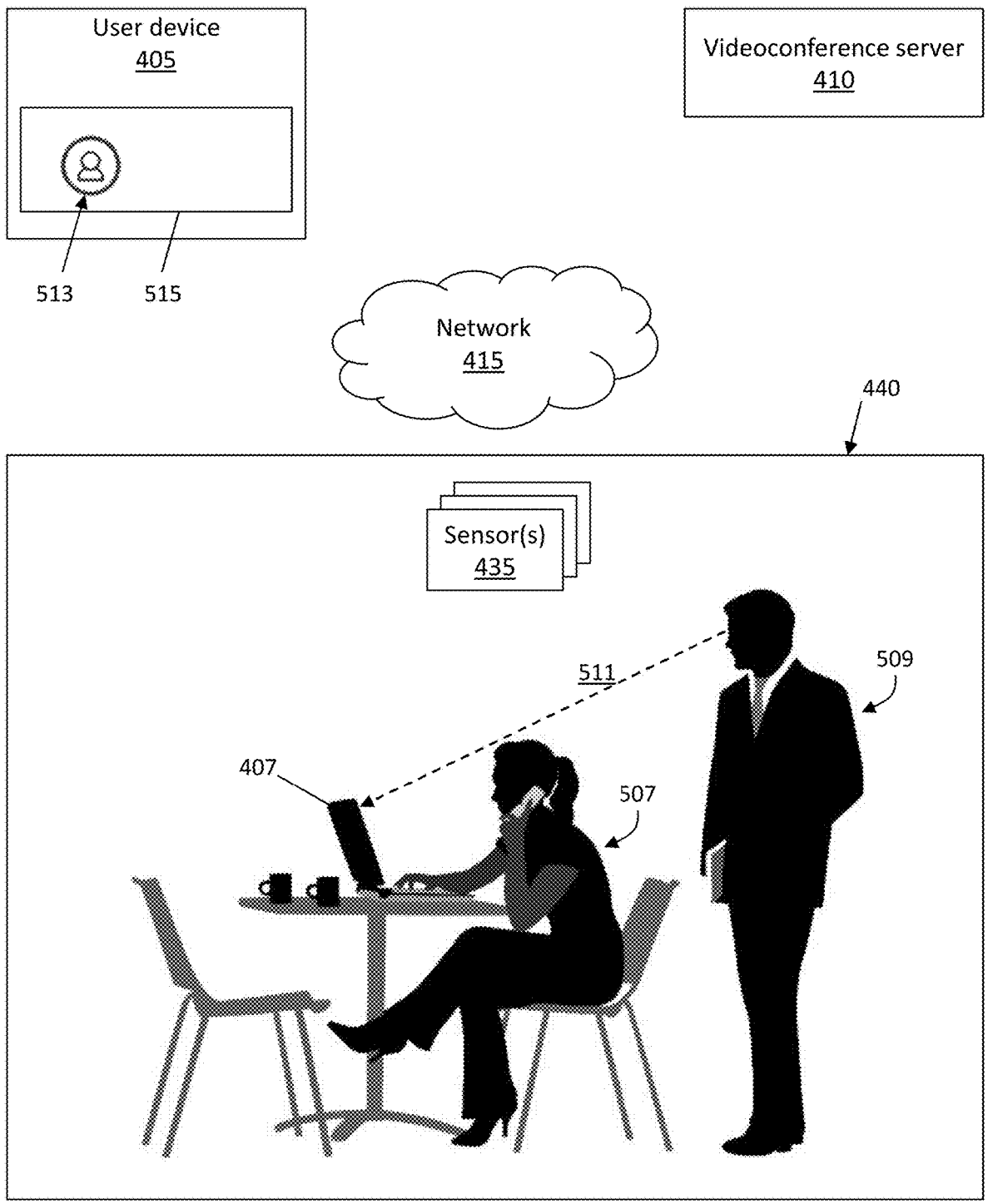
FIG. 5 shows an exemplary use case in accordance with aspects of the invention.

FIG. 5 shows an exemplary use case of the environment of FIG. 4 in accordance with aspects of the invention. In the example shown in FIG. 5, an attendee 507 uses their user device 407 to participate in a videoconference hosted by the videoconference server 410 and presented by a presenter using the user device 405. In the example shown in FIG. 5, the attendee 407 is in a location 440 (e.g., a conference room) that is equipped with one or more sensors 435. In the example shown in FIG. 5, another person 509 is also in the location 440 and this other person 509 is not part of the videoconference. In the example shown in FIG. 5, the other person 509 can see 511 the display of the attendee's user device 407 that is showing the video feed of the videoconference. In this example, if confidential data is included in the video feed of the videoconference, then there is the likelihood of a data breach because the other person 509 can see the confidential data as it is being shown on the attendee's user device 407. Implementations of the invention address this problem by detecting when confidential data is shown in the videoconference, detecting when there is another person in a location of an attendee of the videoconference, and generating an alert when both conditions are satisfied concurrently. In the example shown in FIG. 5, the alert can take the form of a visual indicator 513 (selected from one of plural different visual indictors) displayed in the videoconference interface 515 of the user device 405 of the presenter.

With continued reference to FIGS. 4 and 5, in embodiments the security module 430 permits the presenter to define confidentiality requirements for a videoconference prior to permitting attendees to connect to the video conference. This defining of confidentiality requirements may be performed by the presenter in the videoconference interface on the presenter's user device (e.g., 405). One example of a confidentiality requirement is a set of prerequisites that attendees must adhere to during the videoconference. The prerequisites may include, for example: attendees should be alone in the field of view of the display of their user device (e.g., 407) during the videoconference; attendees should not use their user device to screenshot or record any content of the videoconference; attendees should not use another camera device to take a picture of the display of their user device during the videoconference; attendees should not save content of the videoconference to their user device; attendees should use earbuds or headphones to listen to the videoconference; and attendees should perform other presenter-defined activities on their user device during the videoconference.

Another example of a confidentiality requirement is the presenter providing user input to define certain portions of the content as confidential data. This may include, for example, tagging certain portions of a document (e.g., passages, paragraphs, pages, slides, etc.) as being confidential. Alternatively, to the presenter manually defining the confidential data, the security module 430 may automatically identify confidential data in the content of the videoconference. For example, the security module 430 may use artificial intelligence to automatically identify confidential data in the content of the videoconference. The artificial intelligence may include, for example, a text-based sensitivity technique or a video-subscript-based machine learning technique that identifies whether content contains confidential data. Additionally, or alternatively, the artificial intelligence may include natural language processing and keyword detection. For example, using keyword detection, the security module 430 may detect the word "confidential" on a slide of a document and may tag that slide as containing confidential data. In another example, using natural language processing the security module 430 may detect the phrase "this entire document is confidential" on one page of a multipage document and, based on this, may tag all pages of the document as confidential. These examples are non-limiting, and other techniques may be used to automatically identify confidential data in the content of the videoconference.

Another example of a confidentiality requirement is the presenter providing user input to define a level of tolerated risk for the videoconference. In one example, the level of tolerated risk is a numerical value that the presenter can input in a form field or by using a dial or slider in the videoconference interface on the presenter's user device (e.g., 405). In another example, the level of tolerated risk is one of a predefined set of levels such as low, medium, and high. In this example, each one of low, medium, and high has a different numerical value associated with it, and the numerical value of the one selected by the presenter (e.g., low, medium, and high) is set as the level of tolerated risk. As described later with respect to step 625 of FIG. 6, the numerical value of the level of tolerated risk may be set as a second threshold for determining which one of plural visual indicators to display to the presenter, and a first threshold may be determined as a function of the second threshold.

With continued reference to FIGS. 4 and 5, in embodiments the security module 430 identifies the sensors 435 in the location 440. In embodiments, the security module 430 prompts the conference client application 420 on the attendee user device 407 to search for sensors 435 in the location 440. For example, in response to the prompt from the security module 430, the conference client application 420 on the attendee user device 407 may use a discovery process to locate sensors 435 and may use an API specific to each sensor 435 to connect to the sensor. In embodiments, the security module 430 determines whether the attendee user device 407 has permission to access the sensors 435, such that at runtime the security module 430 can selectively enable and disable collection of data from the sensors for the analysis described herein.

With continued reference to FIGS. 4 and 5, in embodiments the security module 430 identifies capabilities of the attendee user device 407. In embodiments, the security module 430 prompts the attendee user device 407 to identify whether any sensors are available in the attendee user device 407 itself. For example, many endpoint devices, such as a laptop, tablet, or smartphone, include one or more of a camera, infrared sensor, and ultrasonic sensor. In embodiments, the security module 430 may obtain data from such sensors integrated in the attendee user device 407 and may use the data from these sensors for the analysis described herein. In one example, the security module 430 obtains data from IoT sensors that are separate from the attendee user device 407, obtains data from sensors integrated in the attendee user device 407, and uses the data from both types of sensors for the analysis described herein. In embodiments, the security module 430 prompts the attendee user device 407 to indicate whether the attendee user device 407 includes a background recording and/or screenshot function, and to enable the security module 430 to disable these functions on the attendee user device 407 during the videoconference.

With continued reference to FIGS. 4 and 5, in embodiments the security module 430 obtains sensor data from the sensors 435. In embodiments, the security module 430 prompts the user device 407 to obtain sensor data from the sensors 435 when confidential data is presented in the videoconference. In some implementations, the security module 430 does not obtain sensor data during times when no confidential data is presented in the videoconference, thus reducing the usage of computing resources.

In embodiments, when plural sensors are available (e.g., one or more IoT sensors and/or one or more sensors of the user device 407), the security module 430 selects a subset of the plural sensors and obtains sensor data from only the selected subset. In embodiments, the security module 430 selects the subset based on determining which of the sensors is most relevant in the current situation. The relative relevancy of the sensor data may be determined based on a quality of the sensor data, for example based on confidence levels of predictions made using the sensor data. In embodiments, the security module 430 disables the function of collecting sensor data from sensors that are not in the selected subset, thus reducing the usage of computing resources.

With continued reference to FIGS. 4 and 5, in embodiments the security module 430 uses the obtained sensor data to generate a current risk score associated with the user device 407. In implementations, the current risk score is a probability that another person is in the location 400 where the attendee user device 407 displays the videoconference. In embodiments, the current risk score is generated using a machine learning model that receives the sensor data as input and that outputs the probability that another person is in the location where the user device of the attendee displays the videoconference. Different machine learning models may be trained with different training data and used for different types of sensors. As but one example, a convolutional neural network may be trained using training data that is specific to camera data, and the trained convolutional neural network may be used in real time with data from a camera included in the sensors 435 to generate a probability that another person is in the location 400 where the attendee user device 407 displays the videoconference. When data from a single one of the sensors 435 is used, the current risk score may be set as the probability derived using the data of that one sensor. When data from plural ones of the sensors 435 is used, the current risk score may be determined as a function of the plural probabilities derived using the data of the plural sensors. In one example, the function is a non-weighted average of the plural probabilities. In another example, the function is a weighted average of the plural probabilities.

In one exemplary implementation, the sensor 435 comprises a camera, the sensor data is image data of the camera that captures an expression of the attendee during the videoconference, and the risk score is generated based on the expression of the attendee. In this implementation, the security module 430 uses machine learning to learn facial expressions of the attendee that indicate another person is on the room. In this manner, the security module 430 may use the trained machine learning model in real time, with the attendee's facial expressions during the videoconference, to predict whether another person is in the room with the attendee.

With continued reference to FIGS. 4 and 5, in embodiments, in response to determining the current risk score exceeds the level of tolerated risk, the security module 430 presents an alert to the presenter of the videoconference. In embodiments, based on the collected sensor data, the security module 430 identifies whether an unauthorized person is in the location 440 and then presents an alert to the presenter. Upon receiving the alert, the presenter may perform an action in the videoconference, such as: stop presenting until the anomaly is resolved; warn the attendee of the anomaly; and send message to attendee indicating that the videoconference will continue only after the attendee resolves the identified anomaly.

With continued reference to FIGS. 4 and 5, in embodiments, in response to determining the current risk score exceeds the level of tolerated risk, the security module 430 may also present an alert to the attendee. In response, the attendee may take action such as: change the angle of their user device 407 so that the unauthorize person cannot see the display of the user device 407; and move to another location.

In additional embodiments, the security module 430 may notify the presenter prior to the videoconference that the attendee's user device 407 does not have a certain capability. Upon receiving this information, the presenter might take action such as ask the attendee to add the capability to their user device 407 before beginning the videoconference.

In additional embodiments, the security module 430 may notify the presenter prior to the videoconference that the attendee is currently in a situation (e.g., travel) in which the attendee cannot satisfy one or more of the prerequisites. Upon receiving this information, the presenter might take action such as reschedule the videoconference to a later time when the attendee will be able to satisfy all of the prerequisites.

Figure 6:
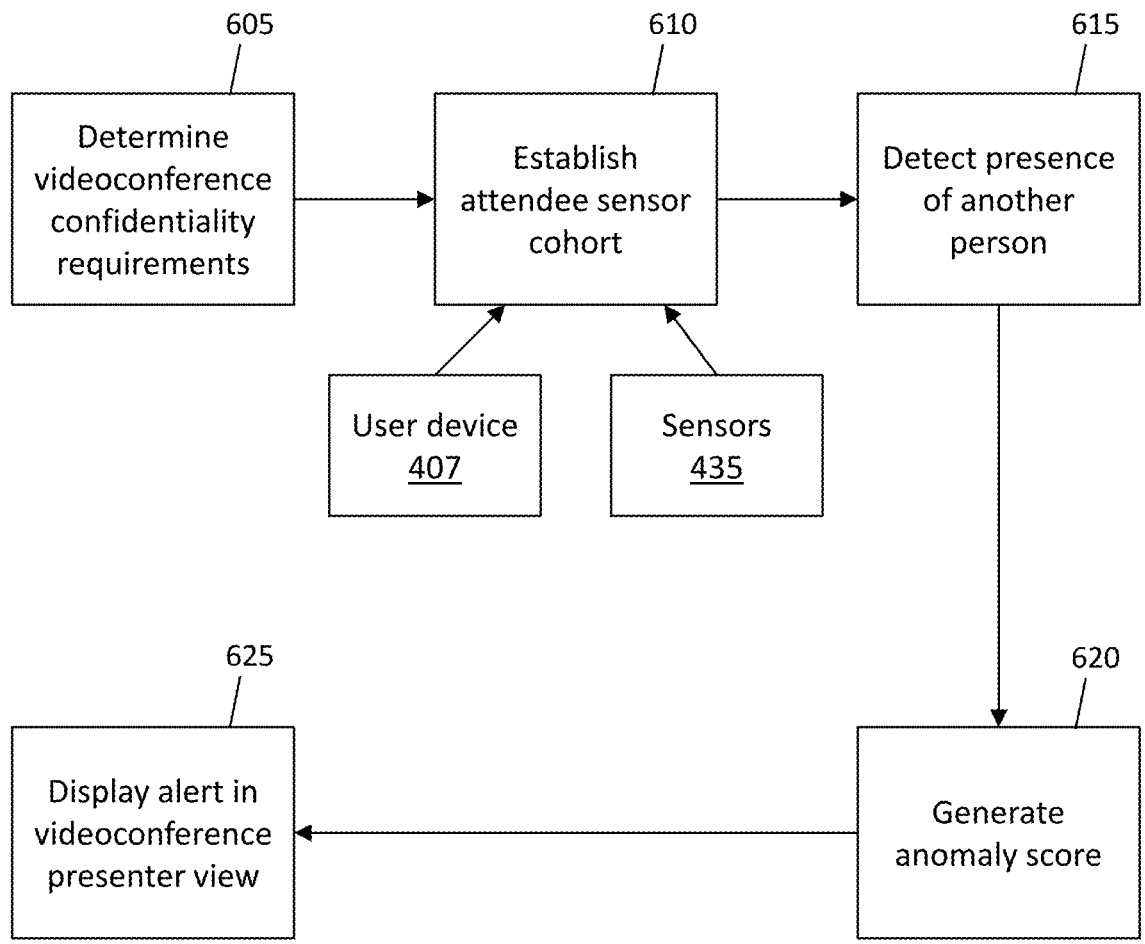
FIG. 6 shows a flowchart of an exemplary method in accordance with aspects of the invention.

FIG. 6 shows a flowchart of an exemplary method in accordance with aspects of the invention. Steps of the method may be carried out in the environment of FIG. 4 and are described with reference to elements depicted in FIG. 4.

At step 605, the system determines confidentiality requirements of a videoconference that is presented by a presenter using user device 405 and attended by an attendee using user device 407. In embodiments, the security module 430 determines the confidentiality requirements of a videoconference based on at least one of user input and automated techniques. In embodiments, the user input comprises the videoconference presenter defining confidentiality requirements via their videoconference interface. This may include, for example, tagging certain portions of a document (e.g., passages, paragraphs, pages, slides, etc.) as being confidential. In embodiments, the automated techniques comprise conventional or later-developed automated techniques for identifying confidential data in a document. This may include, for example, natural language processing and keyword detection. The confidentiality requirements may also include a level of tolerated risk for the videoconference defined by the presenter.

At step 610, the system establishes a respective sensor cohort for each attendee of the videoconference. In embodiments, the client conference application 420 on the user device 407 discoveries and connects to sensors 435 in the location 440 of the user device 407. The discovery and connection may be performed using application programming interfaces (APIs) for each of the sensors. The senor cohort may additionally or alternatively include one or more sensors that are integrated with the user device 407. In embodiments, step 610 includes reporting sensor data from the sensor cohort to the security module 430.

At step 615, the system detects the presence of another person in the location with the attendee and user device 407. In embodiments, the security module 430 analyzes the sensor cohort data to derive a scored probability of another human presence for each attendee. In embodiments, for each attendee of the videoconference, the security module 430 receives data from the sensors 435 in real time and uses the data to determine whether another person is in the same location as the attendee. The presence detection may be performed by a presence detection module that is part of or communicates with the security module 430. The presence detection may be performed using one or more of: object detection (e.g., using a convolutional neural network) using data from a camera; motion sensing using data from an infrared sensor; light fidelity analysis using data from a Li-Fi sensor; ultrasonic human presence detection using data from an ultrasonic sensor; carbon content detection using data from a carbon content detection sensor; and LIDAR depth scan using data from a LIDAR sensor. In embodiments, the security module 430 determines a confidence score of the presence detection for each sensor used in the making the presence detection, wherein the confidence score represents a probability that another person is in the location with the attendee.

At step 620, the system generates an anomaly score (also called a current risk score) for each attendee. In embodiments, the security module 430 generates the anomaly score based on a confidence score(s) of the presence detection. In embodiments, when only one sensor 435 is used to make the presence detection at step 615, then the anomaly score is the confidence score of the presence detection derived from the data of that one sensor. In embodiments, when plural sensors 435 are used to make the presence detection at step 615, then the anomaly score is a function of the respective confidence scores of the presence detections derived from the data of the plural sensors. In one example, the function is a non-weighted average of the confidence scores of the presence detections of the plural sensors. In another example, the function is a weighted average of the confidence scores of the presence detections of the plural sensors, where the weights are configurable in settings of the security module 430. The generating the anomaly score may be performed by an anomaly scoring module that is part of or communicates with the security module 430. In embodiments, the anomaly scoring module reports the scoring for the videoconference.

At step 625, the system presents an alert to the presenter of the videoconference based on the anomaly score from step 620. In embodiments, the system augments the videoconference presenter's view with a visualization of a probability that each attendee is within the confines of the defined conference confidentiality requirements. In embodiments, the security module 430 causes the conference client application 420 to display one of plural predefined visual indications in the videoconference interface of the presenter's user device 405 based in the anomaly score from step 620. In one example, the plural predefined icons include a first icon, a second icon, and a third icon. In this example, the security module 430 causes the conference client application 420 to display the first icon when the anomaly score is less than a first threshold, to display the second icon when the anomaly score is between the first threshold and a second threshold, and to display the third icon when the anomaly score is greater than the second threshold. In this example, the first icon may be green and signify the risk level is low, the second icon may be yellow and signify the risk level is medium, and the third icon may be red and signify the risk level is high. The presenter may perform an action in the videoconference based on which icon is displayed in their videoconference interface.

Still referring to step 625, in one example the second threshold is set as the numerical value of the level of tolerated risk. In this example, the first threshold may be computed based on a predefined function, such as half the second threshold.

Figure 7:
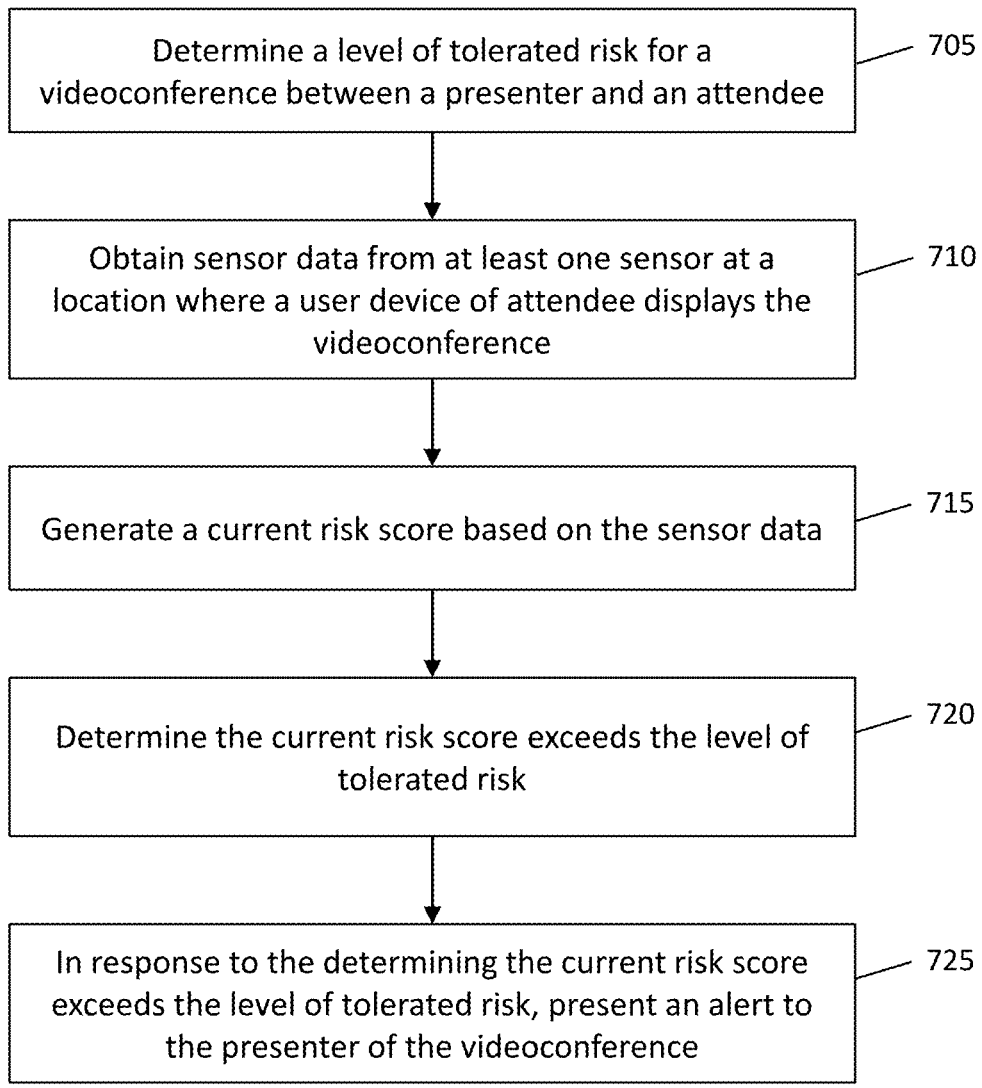
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 4 and are described with reference to elements depicted in FIG. 4.

At step 705, the system determines a level of tolerated risk for a videoconference between a presenter and an attendee. At step 710, the system obtains sensor data from at least one sensor at a location where a user device of the attendee displays the videoconference. At step 715, the system generates a current risk score based on the sensor data. At step 720, the system determines the current risk score exceeds the level of tolerated risk. At step 725, in response to the determining the current risk score exceeds the level of tolerated risk at step 720, the system presents an alert to the presenter of the videoconference.

In embodiments, the alert comprises a visual indicator shown in an interface of the videoconference. In embodiments, the alert comprises one of plural visual indicators shown in an interface of the videoconference, the plural visual indicators comprising: a first visual indicator having a first color and signifying a first level of concern; a second visual indicator having a second color and signifying a second level of concern; and a third visual indicator having a third color and signifying a third level of concern, wherein the first color, the second color, and the third color are all different from one another.

In embodiments, a service provider could offer to perform the processes described herein. In this case, the service provider can create, maintain, deploy, support, etc., the computer infrastructure that performs the process steps of the invention for one or more customers. These customers may be, for example, a business that provides videoconferencing. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a videoconference server, a level of tolerated risk for a videoconference between a presenter and an attendee;
    obtaining, by the videoconference server, sensor data from at least one sensor at a location where a user device of the attendee displays the videoconference;
    generating, by the videoconference server, a current risk score based on the sensor data;
    determining, by the videoconference server, the current risk score exceeds the level of tolerated risk; and
    presenting, by the videoconference server and in response to the determining the current risk score exceeds the level of tolerated risk, an alert to the presenter of the videoconference.

2. The method of claim 1, further comprising identifying confidential data in a portion of the videoconference, wherein the videoconference server obtains the sensor data, generates the current risk score, determines the current risk score exceeds the level of tolerated risk, and presents the alert based on the confidential data being displayed in the videoconference.

3. The method of claim 2, wherein the videoconference server obtains the sensor data, generates the current risk score, determines the current risk score exceeds the level of tolerated risk, and presents the alert only at times when the confidential data is displayed in the videoconference.

4. The method of claim 2, wherein the videoconference server identifies the confidential data based on user input that defines the confidential data.

5. The method of claim 2, wherein the videoconference server identifies the confidential data automatically using artificial intelligence.

6. The method of claim 1, wherein the at least one sensor comprises one or more selected from the group consisting of:
    a camera;
    an ultrasonic sensor;
    an infrared sensor;
    a light detection and ranging (LIDAR) sensor;
    a Li-Fi sensor;
    a microphone; and
    a carbon content detection sensor.

7. The method of claim 6, wherein the at least one sensor is integrated in the user device of the attendee.

8. The method of claim 6, wherein the at least one sensor is separate from the user device of the attendee.

9. The method of claim 8, wherein:
    the videoconference server causes the user device of the attendee to connect to the at least one sensor; and
    the videoconference server receives the sensor data from the at least one sensor via the user device of the attendee.

10. The method of claim 1, wherein the current risk score is a probability that another person is in the location where the user device of the attendee displays the videoconference.

11. The method of claim 10, wherein:
    the at least one sensor comprises a camera;
    the sensor data is image data of the camera that captures an expression of the attendee during the videoconference; and
    the risk score is generated based on the expression of the attendee.

12. A computer program product comprising one or more computer readable storage media having program instructions collectively stored on the one or more computer readable storage media, the program instructions executable to cause a videoconference server to:
    determine a level of tolerated risk for a videoconference between a presenter and an attendee;
    obtain sensor data from at least one sensor at a location where a user device of the attendee displays the videoconference;
    generate a current risk score based on the sensor data, wherein the current risk score is a probability that another person is in the location where the user device of the attendee displays the videoconference;
    determine the current risk score exceeds the level of tolerated risk; and
    in response to the determining the current risk score exceeds the level of tolerated risk, present an alert to the presenter of the videoconference.

13. The computer program product of claim 12, wherein the alert comprises a visual indicator shown in an interface of the videoconference.

14. The computer program product of claim 12, wherein the alert comprises one of plural visual indicators shown in an interface of the videoconference, the plural visual indicators comprising:
    a first visual indicator having a first color and signifying a first level of concern;
    a second visual indicator having a second color and signifying a second level of concern; and
    a third visual indicator having a third color and signifying a third level of concern, wherein the first color, the second color, and the third color are all different from one another.

15. The computer program product of claim 12, wherein the current risk score is generated using a machine learning model that receives the sensor data as input and that outputs the probability that another person is in the location where the user device of the attendee displays the videoconference.

16. The computer program product of claim 12, wherein the program instructions are executable to cause the videoconference server to instruct the user device of the attendee to disable video recording and screenshot functions during the videoconference.

17. A system comprising:
    a processor, a computer readable memory, one or more computer readable storage media, and program instructions collectively stored on the one or more computer readable storage media, the program instructions executable to:
    determine a level of tolerated risk for a videoconference between a presenter and an attendee;
    obtain sensor data from at least one sensor at a location where a user device of the attendee displays the videoconference;
    generate a current risk score based on the sensor data, wherein the current risk score is a probability that another person is in the location where the user device of the attendee displays the videoconference;
    determine the current risk score exceeds the level of tolerated risk; and
    in response to the determining the current risk score exceeds the level of tolerated risk concurrently with confidential data being displayed in the videoconference, present an alert to the presenter of the videoconference.

18. The system of claim 17, wherein the location comprises a room and the user device of the attendee is in the room.

19. The system of claim 17, wherein the alert comprises a visual indicator shown in an interface of the videoconference.

20. The system of claim 17, wherein the alert comprises one of plural visual indicators shown in an interface of the videoconference, the plural visual indicators comprising:
- a first visual indicator having a first color and signifying a first level of concern;
- a second visual indicator having a second color and signifying a second level of concern; and
- a third visual indicator having a third color and signifying a third level of concern, wherein the first color, the second color, and the third color are all different from one another.

* * * * *